United States Patent
Pradeepkumar et al.

(10) Patent No.: US 12,237,721 B2
(45) Date of Patent: Feb. 25, 2025

(54) ELECTRIC MACHINE WITH HELICAL COOLING PATH

(71) Applicant: FORD GLOBAL TECHNOLOGIES, LLC, Dearborn, MI (US)

(72) Inventors: Akash Pradeepkumar, Westland, MI (US); Singar Rathnam, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 270 days.

(21) Appl. No.: 17/522,233

(22) Filed: Nov. 9, 2021

(65) Prior Publication Data

US 2023/0145886 A1    May 11, 2023

(51) Int. Cl.
H02K 1/20 (2006.01)
H02K 1/16 (2006.01)
H02K 15/02 (2006.01)

(52) U.S. Cl.
CPC .................. *H02K 1/20* (2013.01); *H02K 1/16* (2013.01); *H02K 15/024* (2013.01)

(58) Field of Classification Search
CPC .......... H02K 1/185; H02K 9/227; H02K 1/20; H02K 9/19
See application file for complete search history.

(56) References Cited

U.S. PATENT DOCUMENTS

| | | | | |
|---|---|---|---|---|
| 5,173,629 A | * | 12/1992 | Peters | H02K 1/20 |
| | | | | 310/58 |
| 5,331,238 A | * | 7/1994 | Johnsen | H02K 5/203 |
| | | | | 310/58 |
| 6,954,010 B2 | | 10/2005 | Rippel et al. | |
| 8,053,938 B2 | * | 11/2011 | Pal | H02K 1/20 |
| | | | | 310/58 |
| 8,405,262 B1 | | 3/2013 | Beatty et al. | |
| 9,869,319 B2 | * | 1/2018 | Mekota | F04D 25/0606 |
| 2014/0265670 A1 | | 9/2014 | Chamberlin et al. | |
| 2017/0271955 A1 | | 9/2017 | Hanumalagutti et al. | |
| 2020/0389064 A1 | | 12/2020 | Leong et al. | |

* cited by examiner

*Primary Examiner* — Leda T Pham
(74) *Attorney, Agent, or Firm* — David B Kelley; Brooks Kushman P.C.

(57) ABSTRACT

An electric machine includes a stator core having a plurality of stacked laminations that are arranged in sets that each define a circumferentially extending slot through a thickness of the set. The sets are circumferentially rotated relative to each other in sequence such that each slot only partially overlaps with one or more adjacent slots to form a continuous helical cooling path around the stator core. Windings are supported on the stator core.

19 Claims, 6 Drawing Sheets

ELECTRIC MACHINE WITH HELICAL COOLING PATH

TECHNICAL FIELD

The present disclosure relates to electric machines, for use with electric and hybrid-electric vehicles, that are capable of acting either as a motor or as a generator.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, an electric machine includes a stator core having a plurality of stacked laminations that are arranged in sets that each define a circumferentially extending slot through a thickness of the set. The sets are circumferentially rotated relative to each other in sequence such that each slot only partially overlaps with one or more adjacent slots to form a continuous helical cooling path around the stator core. Windings are supported on the stator core.

According to another embodiment, an electric machine includes a stator core having a plurality of lamination sets each with at least two circumferentially extending notches though a thickness of the lamination set. The lamination sets are circumferentially rotated relative to each other in sequence such that each notch partially overlaps with one or more adjacent ones of the notches to form two continuous helical cooling paths around the stator core.

According to yet another embodiment, a method of assembling a stator core includes forming laminations each having a circumferentially extending slot through a thickness of the lamination; stacking the laminations such that each lamination is circumferentially rotated relative to neighboring ones of the laminations so that the slots are circumferentially staggered by an angle that is less than an arc length of the slots and the slots partially overlap to define a helical cooling path; and joining the laminations to form the stator core.

DETAILED DESCRIPTION

Figure 1:
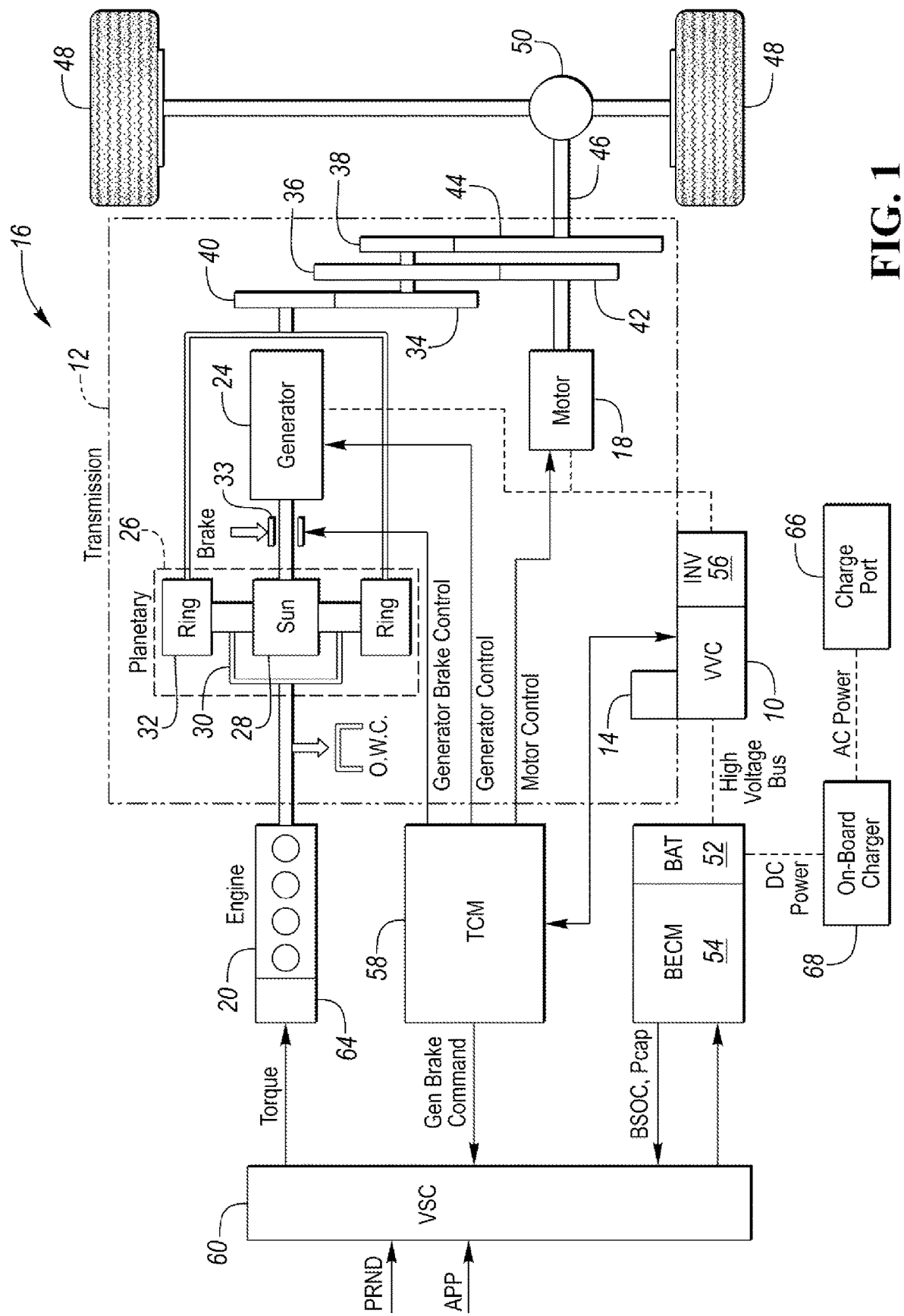
FIG. 1 is a schematic diagram of an example hybrid vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58, and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
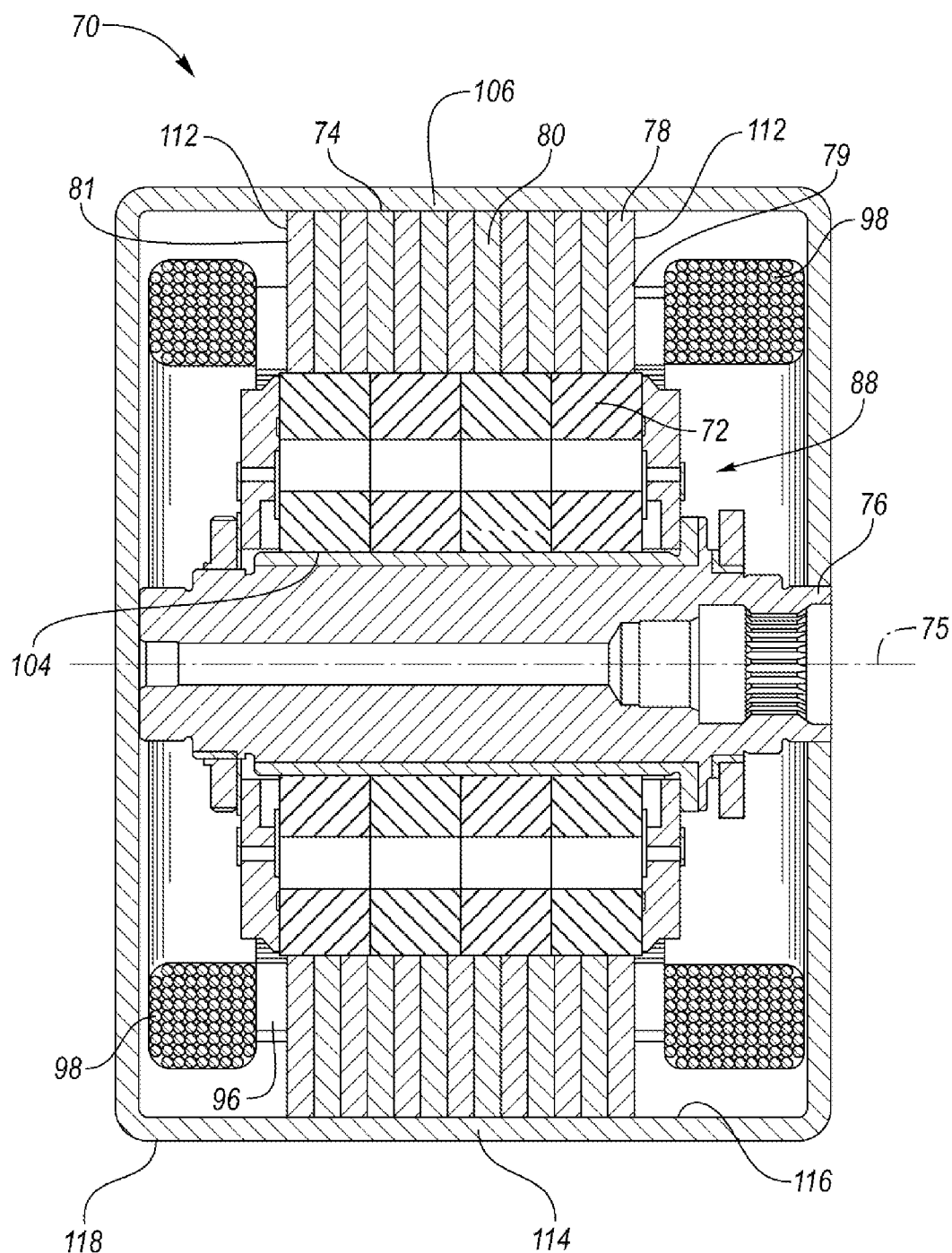
FIG. 2 is side view, in cross section, of a portion of an example electric machine.

Referring to FIG. 2, an example electric machine 70 includes a stator 74 having a plurality of laminations 78. The electric machine 70 has a central axis or centerline 75. Each of the laminations 78 includes a front side and a back side.

When stacked, the front and back sides are disposed against adjacent front and back sides to form a stator core 80. Each of the laminations 78 may define a hollow center.

Each lamination 78 includes an inner diameter defining a plurality of teeth extending radially inward toward the inner diameter. Adjacent teeth 90 cooperate to define slots. The teeth and the slots of each lamination 78 are aligned with adjacent laminations to define stator slots extending axially through the stator core 80 between the opposing end faces 112. The end faces 112 define the opposing ends of the core 80 and are formed by the first and last laminations 79, 81 of the stator core 80. A plurality of windings (also known as coils, wires, or conductors) 96 are wrapped around the stator core 80 and are disposed within the stator slots. The windings 96 may be disposed in an insulating material (not shown). Portions of the windings 96 generally extend in an axial direction along the stator slots. At the end faces 112 of the stator core, the windings bend to extend circumferentially around the end faces 112 of the stator core 80 forming the end windings 98. While shown as having distributed windings, the windings could also be of the concentrated or hairpin type.

A rotor 72 is disposed within the cavity 88 of the stator 74. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts or gears, or the like. The electric machine may also act as generator by mechanically rotating the rotor 72 to generate electricity.

The stator core 80 includes an inner diameter 104 and an outer diameter 106 that are each concentric with the centerline 75 of the stator core 80. The stator 74 is received within a housing 114. The housing 114 may be cylindrical to match the shape of the stator. The housing 114 includes an inner circumferential surface 116 that is disposed tightly against the outer diameter 106 of the stator core 80 and an outer circumferential surface 118.

The electric motor 70 may be cooled by circulating a fluid through the stator core. This may be in addition to any spray cooling (optional). The fluid may be any dielectric fluid such as oil, e.g., automatic transmission fluid. The following figures and text describe one or more example thermal management systems for the electric machine 70.

Figure 3:
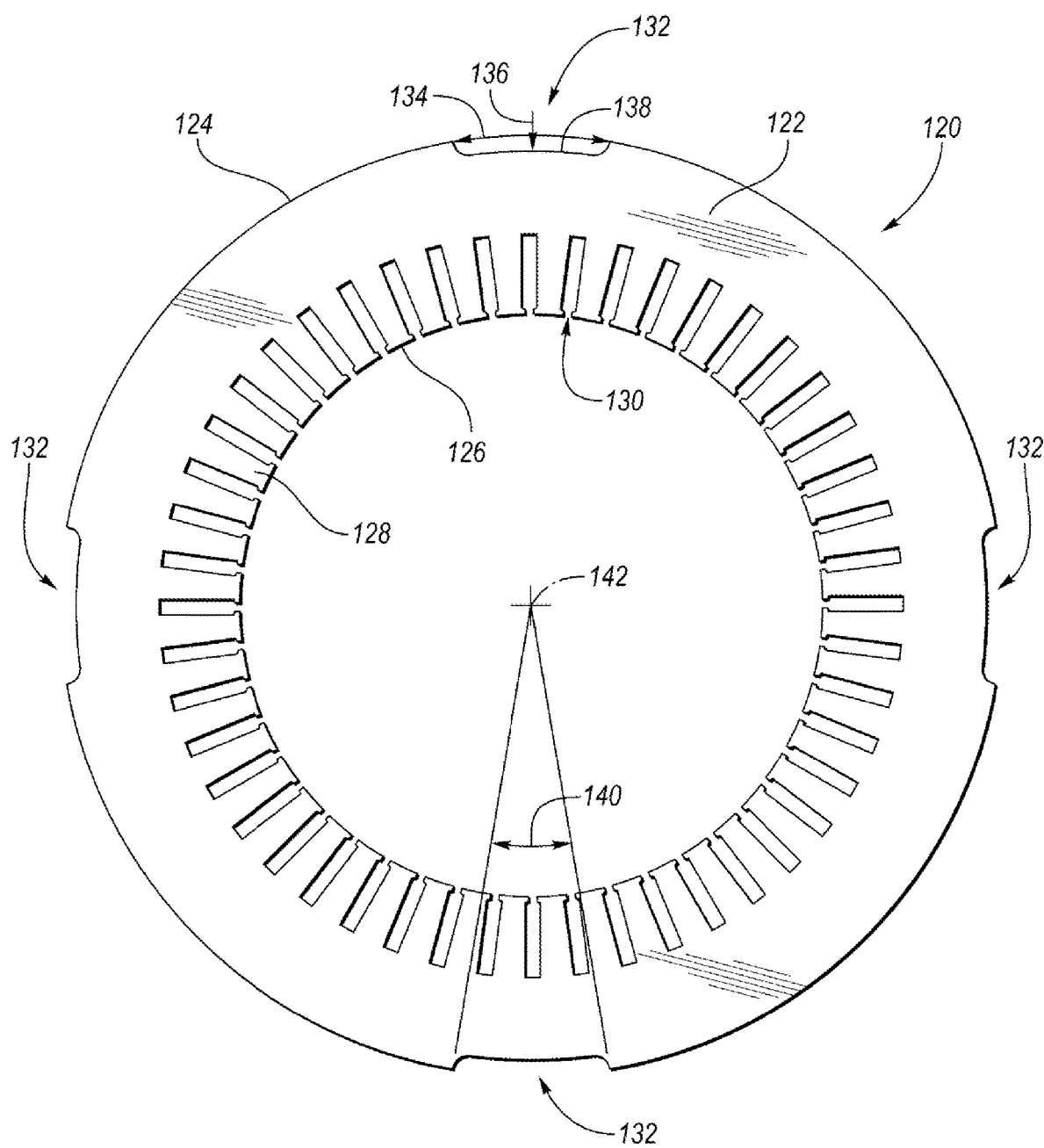
FIG. 3 is a top view of a stator lamination according to one or more embodiments of this disclosure.

Referring to FIG. 3, an example lamination 120 includes opposing faces 122 and an outer circumferential edge or surface (outer diameter) 124. An inner diameter 126 of the lamination defines teeth 128, that when stacked with other laminations, defines the stator slots 130 for receiving the windings. The lamination defines one or more openings or slots 132 located near or at outer diameter 124. The slots 132 extend through a thickness of the lamination 120, which is defined between the opposing faces 122. In the illustrated embodiment, slots 132 are an open slots cut out of the outer diameter 124 to be recessed inwardly from the outer diameter. Each slot 132 has a circumferential width 134 extending between the opposing ends and a radial depth 136 that is measured from the outer diameter 124 to the inner circumferential surface 138 of the slot 132.

The number of slots 132 may vary by embodiment depending upon the cooling requirements of the electric machine. As will be explained in detail below, the number of slots increases the amount of cooling channels through the stator core and also increases the number of laminations in direct contact with cooling fluid. In the illustrated embodiment, the lamination 120 includes four slots 132 that are spaced equidistant every 90 degrees. This places the slots 132 diametrically opposite from another of openings. The circumferential width 134 of the slots 132 may be measured by arc length 140, which is an angle about the center 142, which lies on the centerline 75. The arc length 140 may be increased or decreased based on the cooling needs of the electric machine. The arc length of each of the slots 132 may be the same or may be different. In the illustrated embodiment, each of the slots 132 has a same arc length 140 and also a same width 134 and depth 136, i.e., the openings 138 are all designed to be the same size.

The laminations may be formed of metal or metal alloy and maybe fabricated by stamping. The stamping process may start with a donut-shaped blank that is stamped in a single process to have all of the various openings, teeth, etc. The plurality of same laminations may then be stacked and permanently joined together the form a stator core.

Figure 4:
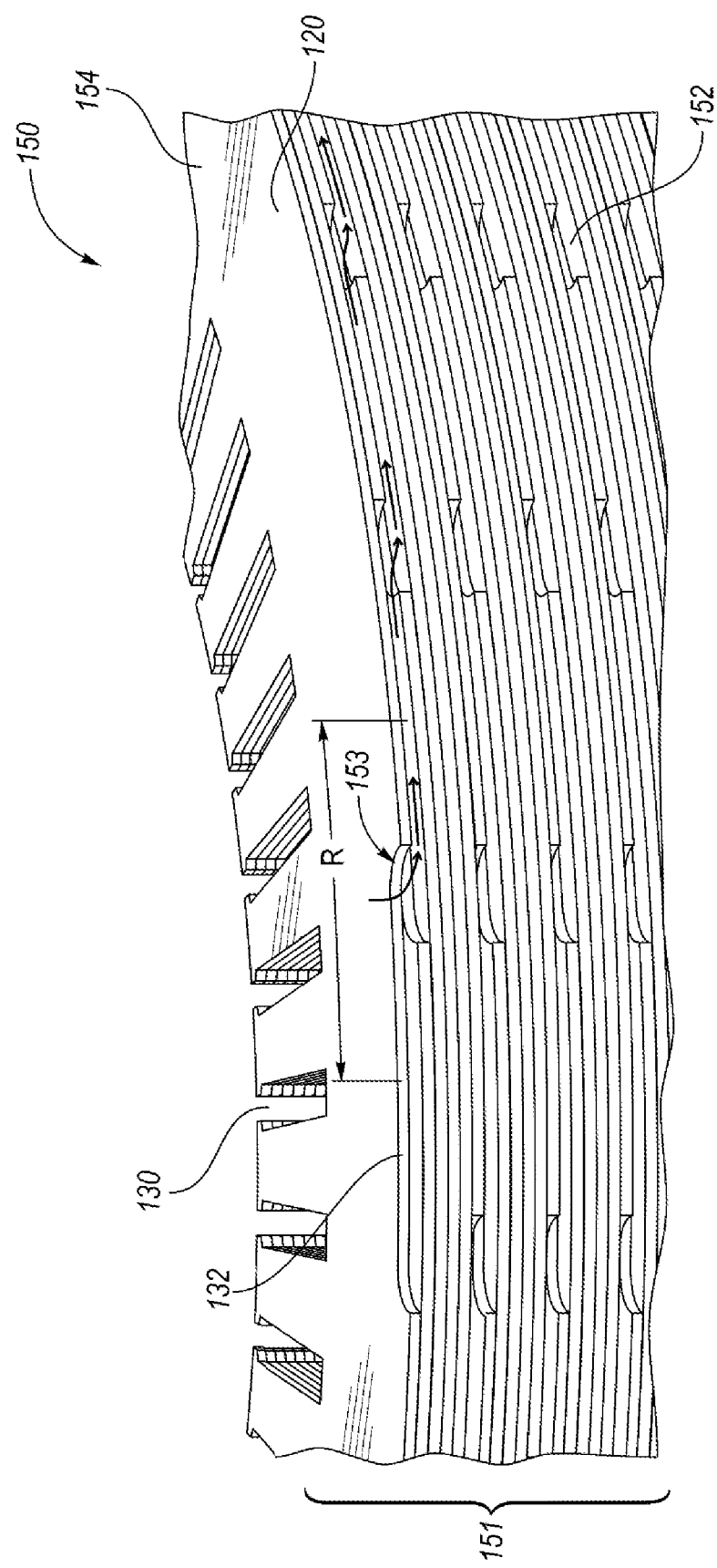
FIG. 4 is a perspective view of a portion of the stator core illustrating a helical cooling path according to one or more embodiments of this disclosure.

Referring to FIG. 4, a stator core 150 is formed of a plurality of the laminations 120 that have been arranged in a linear stack 151. The stator core 150 includes a plurality of helical cooling paths 152 that wrap around stator core 150. Each of the cooling paths 152 begin at the first lamination 154 and terminate at a last lamination (not visible in FIG. 4) to traverse the axial length of the stator core albeit in a spiral manner. The number of helical cooling paths 152 corresponds to the number of slots or openings 132 in each lamination such that the paths are equal to the number of slots in each lamination. Thus, the illustrated embodiment of FIG. 4 has four cooling paths that commence and end 90 degrees apart around the stator core 150. The cooling paths 152 are continuous from the first lamination 154 to the last lamination and do not intermix with the other the cooling paths. The cooling paths 154 are directly formed by the laminations 120 placing the cooling fluid is in direct contact with stator core 150 and resulting in efficient transfer of thermal energy.

In this example, the laminations 120 are circumferentially rotated relative to each other in sequence such that each slot 132 only partially overlaps with one or more adjacent slots to form the continuous helical cooling path(s) 152 around the stator core 150. The amount of circumferential rotation (R) or twist between adjacent laminations is less than the arc length 140 so that the slots partially overlap to form a hole 153 for cooling fluid to drop to the next level. The partial overlap places the adjacent slots in fluid communication to form the path 152. The rotation (R) is in a forward direction of the helical cooling path and may be the same for all laminations of the stack, i.e., all laminations are rotated by same amount relative to their neighbors. By modifying the amount of rotation (R) relative to arc length, the hydraulic properties (such as flow rate, pressure, and velocity) of the coolant paths can be adjusted based on design needs. Modifying the rotation also adjusts the number of spirals a cooling path has around the stator core, however, the rotation (R) cannot exceed the arc length otherwise the fluid path would be cutoff. The rotation R may be measured between the midpoints of the slots 132 of two adjacent laminations. Generally, increasing the rotation (R) beyond the arc length divided by 2 increases the pressure and number of spirals, whereas decreasing the rotation (R) to be less than the arc length divided by 2 decreases the pressure and the number of spirals.

The laminations 120 may be arranged in sets in which each lamination of the set has a same circumferential position, i.e., the slots 132 are aligned. Used herein, "a set of laminations" refers to one or more laminations. In FIG. 4, each set includes a single lamination resulting in all of the laminations being rotated relative to each other, but this need not be the case.

In the open slot embodiment, the outer diameter of the stator core is disposed tightly against the inner diameter of the housing to enclose the cooling paths. That is, the stator core and the housing cooperate to define the cooling paths.

Figure 5:
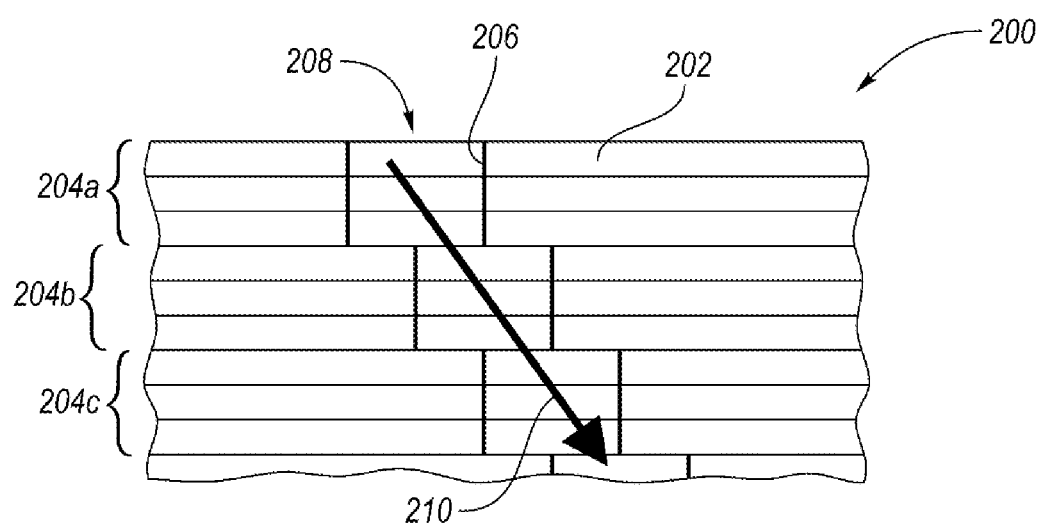
FIG. 5 is a side view of a portion of the stator core illustrating a helical cooling path according to another embodiment of this disclosure.

Referring to FIG. 5, another stator core 200 has laminations 202 arranged in sets 204. In the illustrated embodiment, each set has three laminations. Within each set, the laminations 202 are aligned so that their individual slot(s) 206 form one or more collective slots 208 of the set 204. Like FIG. 4, the sets 204 are circumferentially rotated relative to each other to form the helical cooling path 210. Like above, the slots 208 have arc lengths and the amount of the circumferential rotation of the sets is less than the arc lengths so that the slots partially overlap. While FIG. 5 illustrates each set 204a, 204b, and 204c as having three laminations each, this is just one example. The sets 204 they include significantly more laminations, such as 10 laminations, depending upon the number of laminations in the stack, the arc length of the slots, the thickness of the laminations, and the rotation (R).

Figure 6:
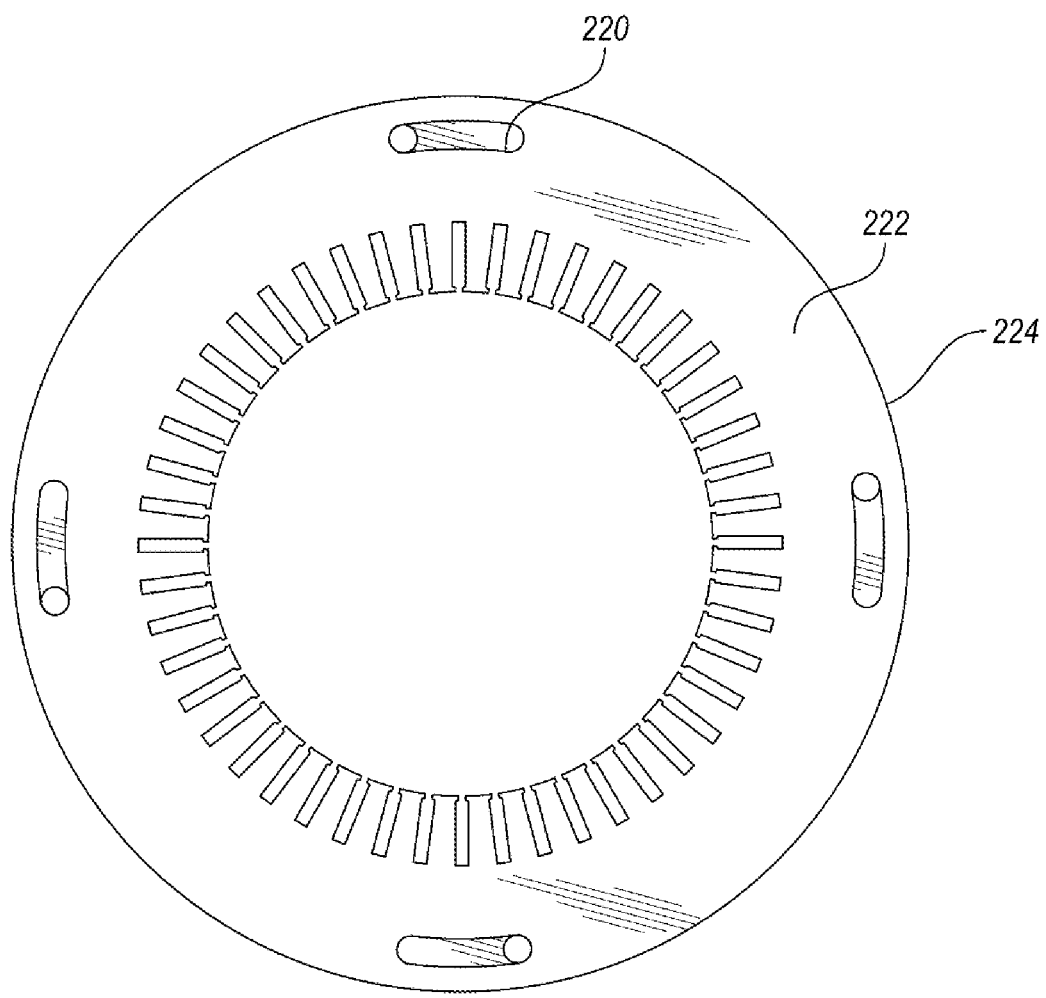
FIG. 6 is a top view of the stator core according to an alternative embodiment.

FIG. 6 illustrates an alternative embodiment in which the slots are closed slots 220. That is, rather than forming the slots into the outer diameter of the stator core, the slots 220 are disposed completely within the stator core 222 and inboard of the outer diameter 224. In this embodiment, the stator core 222 completely defines the fluid path rather than relying on cooperation of the housing to partially bound cooling path. The details of the embodiment of FIG. 6 are the same as FIGS. 4 and 5 as described above and will not be repeated for brevity.

Figure 7:
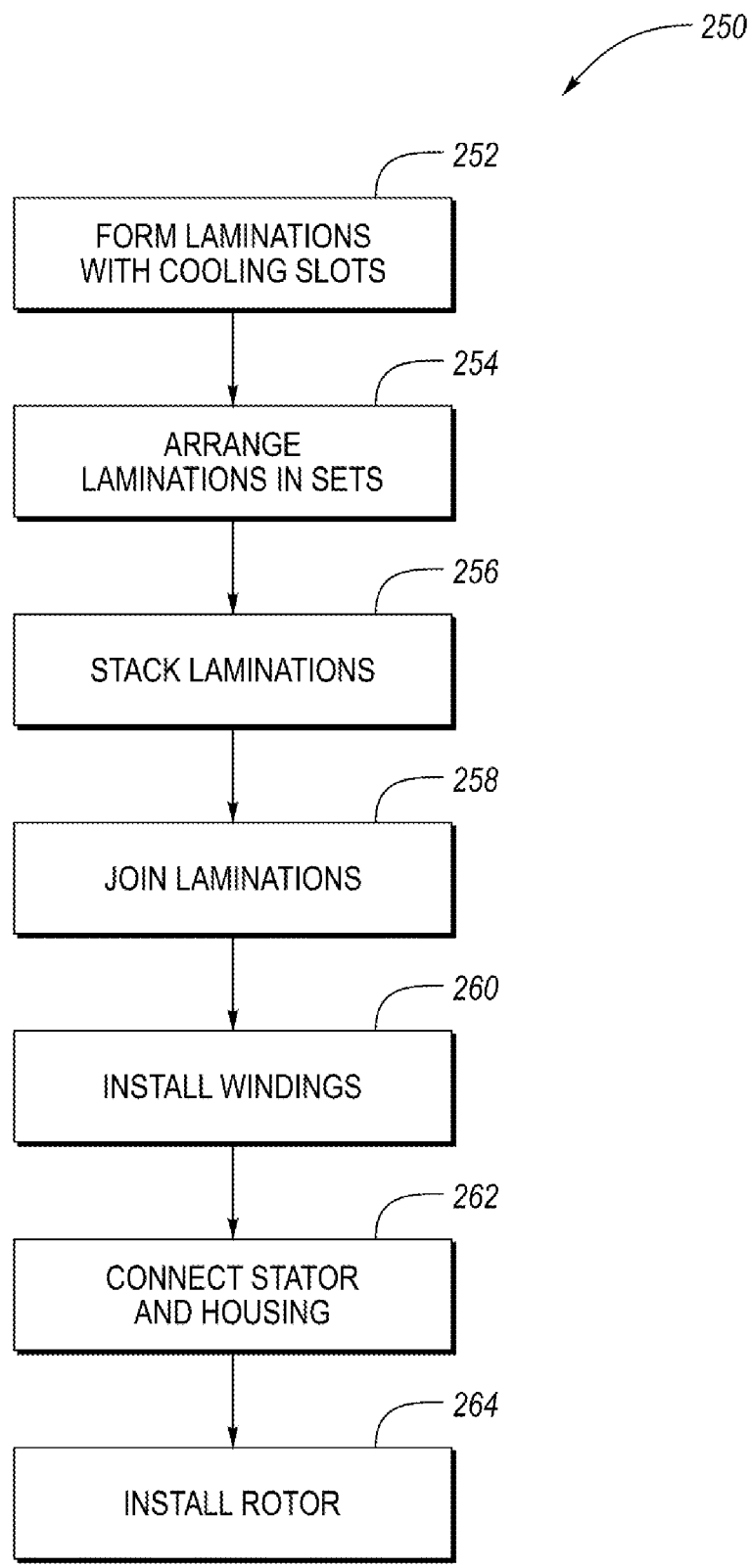
FIG. 7 is a method of assembly for a stator core.

FIG. 7 illustrates a method 250 of assembling an electric machine having helical cooling paths as described above. At step 252, laminations are formed with the cooling slots as described above. The slots may be open slots or closed slots. At step 254, the laminations are arranged in sets that include one or more lamination. The laminations are stacked at step 256. During the stacking step, the sets laminations are rotated or twisted relative to each other by an amount of rotation (R) as described above. The twisting combined with the overlap of the slots forms the helical cooling path through the stator core. At step 258, the laminations are joined to each other to form a solid stator core. The windings are installed at operation 260. At operation 262, the stator is installed in the housing. In the open slot embodiment, the stator is received in the housing with the outer diameter tightly against the inner diameter of the housing to fully enclose the helical cooling paths. The rotor is installed within the stator at operation 264.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator core including a plurality of stacked laminations, the laminations being arranged in sets that each define four circumferentially extending slots through a thickness of the set, wherein each of the slots is diametrically opposite another one of the slots, and all of the slots have a same arc length, wherein the sets are circumferentially rotated relative to each other in sequence such that each of the slots only partially overlaps with one or more adjacent ones of the slots to form a continuous helical cooling path around the stator core, wherein an amount of circumferential rotation between adjacent ones of the laminations is greater than the arc length divided by two and less than the arc length; and
windings supported on the stator core.

2. The electric machine of claim 1, wherein the circumferential rotation of the sets is less than arc lengths of the slots so that the slots partially overlap.

3. The electric machine of claim 1, wherein the circumferential rotation is in a forward direction of the helical cooling path.

4. The electric machine of claim 1, wherein each of the sets includes one or more laminations.

5. The electric machine of claim 4, wherein each of the sets includes at least two laminations.

6. The electric machine of claim 1, wherein each of the sets defines another circumferentially extending slot through the thickness of the set, wherein the sets are circumferentially rotated relative to each other in sequence such that each of the another slots only partially overlaps with adjacent ones of the another slots to form a second continuous helical cooling path around the stator core.

7. The electric machine of claim 1, wherein the slots are notches located on an outer diameter of the stator core.

8. The electric machine of claim 7 further comprising a housing defining an inner circumferential surface, wherein the stator core is disposed within the housing such that the notches cooperate with the inner circumferential surface of the housing to define the helical cooling path.

9. The electric machine of claim 1, wherein each of the sets are circumferentially rotated by a same amount.

10. The electric machine of claim 1 further comprising a rotor supported for rotation within the stator.

11. An electric machine comprising:
a stator core including a plurality of lamination sets each having at least two circumferentially extending notches though a thickness of the lamination set, wherein the lamination sets are circumferentially rotated relative to each other in a continuous, forward sequence such that each of the notches partially overlaps with one or more adjacent ones of the notches to form two continuous helical cooling paths around the stator core, wherein, for each lamination set, a pair of the at least two notches are diametrically opposite each other, wherein each of the lamination sets is circumferentially rotated relative to adjacent ones of the lamination sets so that the notches are circumferentially staggered by an angle that is less than an arc length of the notches and greater than the arc length divided by two.

12. The electric machine of claim 11, wherein each of the lamination sets includes one or more laminations.

13. The electric machine of claim 11, wherein an amount of circumferential rotation between adjacent ones of the lamination sets is less than the arc length of the notches.

14. The electric machine of claim 11 further comprising a housing defining an inner circumferential surface, wherein the stator core is disposed within the housing such that the notches cooperate with the inner circumferential surface of the housing to define the helical cooling paths.

15. The electric machine of claim 11, wherein the stator core defines axially extending slots, and further comprising windings disposed in the axially extending slots.

16. The electric machine of claim 11, wherein the at least two notches are four notches.

17. An electric machine comprising:
a stator core including a plurality of lamination sets each having at least two circumferentially extending notches though a thickness of the lamination set, wherein the lamination sets are circumferentially rotated relative to each other in a continuous, forward sequence such that each of the notches partially overlaps with one or more adjacent ones of the notches to form two continuous helical cooling paths around the stator core, wherein, for each lamination set, a pair of the at least two notches are diametrically opposite each other, wherein the circumferential rotation of the lamination sets is less than arc lengths of the notches so that the slots partially overlap, wherein the circumferential rotation of the lamination sets is the same for all lamination sets, the arc lengths all have a same value, and the circumferential rotation of the lamination sets is greater than the arc length divided by two.

18. A method of assembling a stator core comprising:
forming laminations each having at least two circumferentially extending slots through a thickness of the lamination, wherein the slots are diametrically opposing;
stacking the laminations such that each lamination is circumferentially rotated relative to neighboring ones of the laminations so that the slots are circumferentially staggered by an angle that is less than an arc length of the slots and greater than the arc length divided by two such that the slots partially overlap to define a pair of helical cooling paths; and
joining the laminations to form the stator core.

19. The method of claim 18, wherein the slots are notches located on outer diameters of the laminations.

* * * * *